US008948549B2

United States Patent
Picard et al.

(10) Patent No.: US 8,948,549 B2
(45) Date of Patent: Feb. 3, 2015

(54) POLARIZATION ROTATOR ASSEMBLY INCLUDING A SUBWAVELENGTH COMPOSITE PORTION

(71) Applicant: Teraxion Inc., Québec (CA)

(72) Inventors: Marie-Josée Picard, Québec (CA); Yves Painchaud, Québec (CA)

(73) Assignee: Teraxion Inc., Quebec (CA)

( * ) Notice: Subject to any disclaimer, the term of this patent is extended or adjusted under 35 U.S.C. 154(b) by 0 days.

(21) Appl. No.: 14/092,569

(22) Filed: Nov. 27, 2013

(65) Prior Publication Data
US 2014/0153862 A1 Jun. 5, 2014

Related U.S. Application Data

(60) Provisional application No. 61/730,253, filed on Nov. 27, 2012.

(51) Int. Cl.
*G02B 6/00* (2006.01)
*G02B 6/27* (2006.01)

(52) U.S. Cl.
CPC .................... *G02B 6/2766* (2013.01)
USPC ................. 385/11; 385/37; 385/43

(58) Field of Classification Search
USPC ............... 385/37, 31, 50, 39, 43, 11
See application file for complete search history.

(56) References Cited

U.S. PATENT DOCUMENTS

| | | | |
|---|---|---|---|
| 7,075,722 B2 * | 7/2006 | Nakai | 359/571 |
| 7,792,403 B1 | 9/2010 | Little et al. | |
| 8,750,651 B2 * | 6/2014 | Chen | 385/11 |
| 2012/0183250 A1 | 7/2012 | Cheben et al. | |

OTHER PUBLICATIONS

Bock et al., Sub-wavelength grating mode transformers in silicon slab waveguides, Optical Society of America, Oct. 12, 2009 / vol. 17, No. 21 / Optics Express p. 19120-19133.
Cheben et al., Subwavelength waveguide grating for mode conversion and light coupling in integrated optics, Optical Society of America, May 29, 2006 / vol. 14, No. 11 / Optics Express, p. 4695-4702.
Dai et al., Novel concept for ultracompact polarization splitter-rotator based on silicon nanowires, Optical Society of America, May 23, 2011 / vol. 19, No, 11 / Optics Express, p. 10940-10949.
Dai et al., Mode conversion in tapered submicron silicon ridge optical waveguides, Optical Society of America, Jun. 4, 2012 / vol. 20, No. 12 / Optics Express, p. 13425-13439.
Ding et al., Fabrication tolerant polarization splitter and rotator based on a tapered directional coupler, Optical Society of America, Aug. 27, 2012 / vol. 20, No. 18 / Optics Express, p. 20021-20027.

(Continued)

*Primary Examiner* — Ellen Kim
(74) *Attorney, Agent, or Firm* — Bookoff McAndrews, PLLC

(57) ABSTRACT

A polarization rotator assembly for rotating a polarization mode of an electromagnetic signal is provided. The polarization rotator assembly has a waveguiding structure of co-extensive first and second layers defining, successively, an input portion, a subwavelength composite portion and a polarization rotating portion. The subwavelength composite portion is formed by the first and second layers, where the second layer defines a subwavelength pattern. The polarization rotator portion is geometrically configured to rotate the polarization mode of the electromagnetic signal.

21 Claims, 13 Drawing Sheets

(56) References Cited

OTHER PUBLICATIONS

Liu et al., Silicon-on-insulator polarization splitting and rotating device for polarization diversity circuits, Optical Society of America, Jun. 20, 2011 / Vol, 19, No. 13 / Optics Express, p. 12646-12651.

Watts et al., Integrated mode-evolution-based polarization splitter, Optical Society of America, May 1, 2005 / vol. 30, No. 9 / Optics Letters, p. 967-969.

Watts et al., Integrated mode-evolution-based polarization rotators, Optical Society of America, Jan. 15, 2005 / vol. 30, No. 2 / Optics Letters, p. 138-140.

Zhang et al., Silicon waveguide based mode-evolution polarization rotator, Silicon Photonics and Photonic Integrated Circuits II, Proc. of SPIE vol. 7719, 2010, p. 77190C-1-77190C-8.

Zhang et al., Silicon waveguide based TE mode converter, Optical Society of America, Nov. 22, 2010 / vol. 18, No. 24 / Optics Express, p. 25264-25270.

Shiraishi et al., A two-port polarization-insensitive coupler module between single-mode fiber and silicon wire waveguide, Optical Society of America, Oct. 22, 2012 / vol. 20, No. 22/ Optics Express, p. 24370-24375.

* cited by examiner

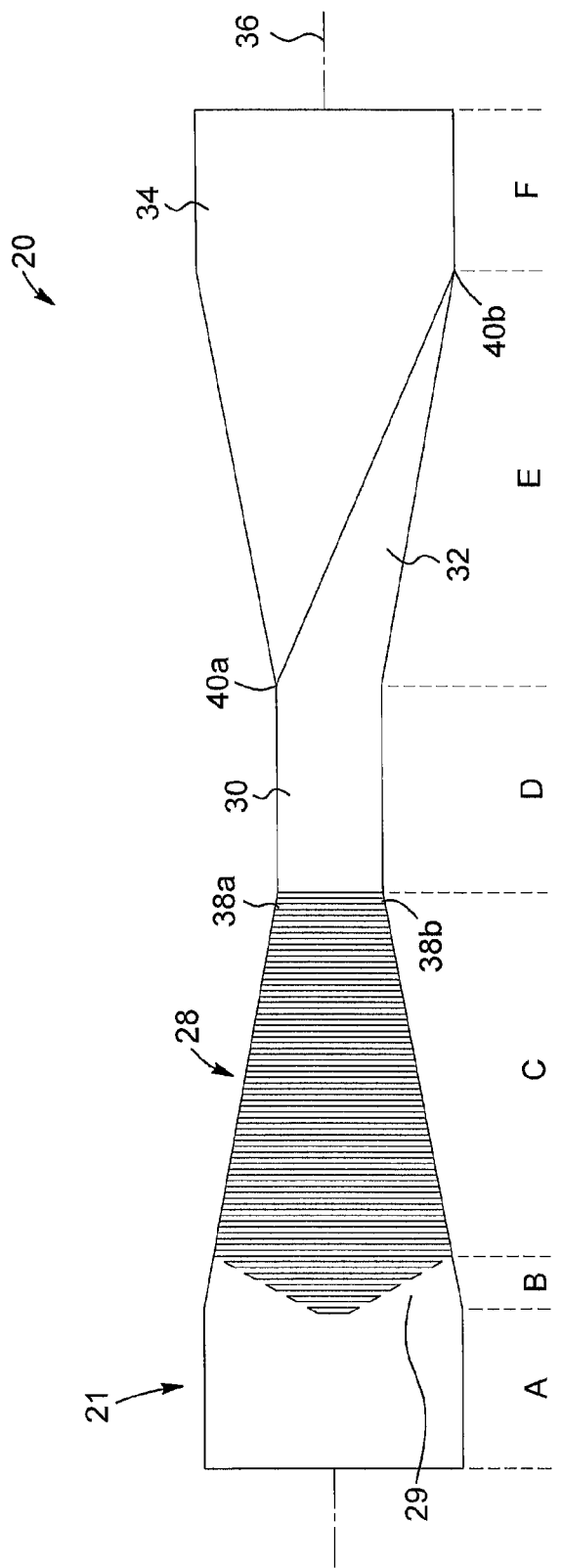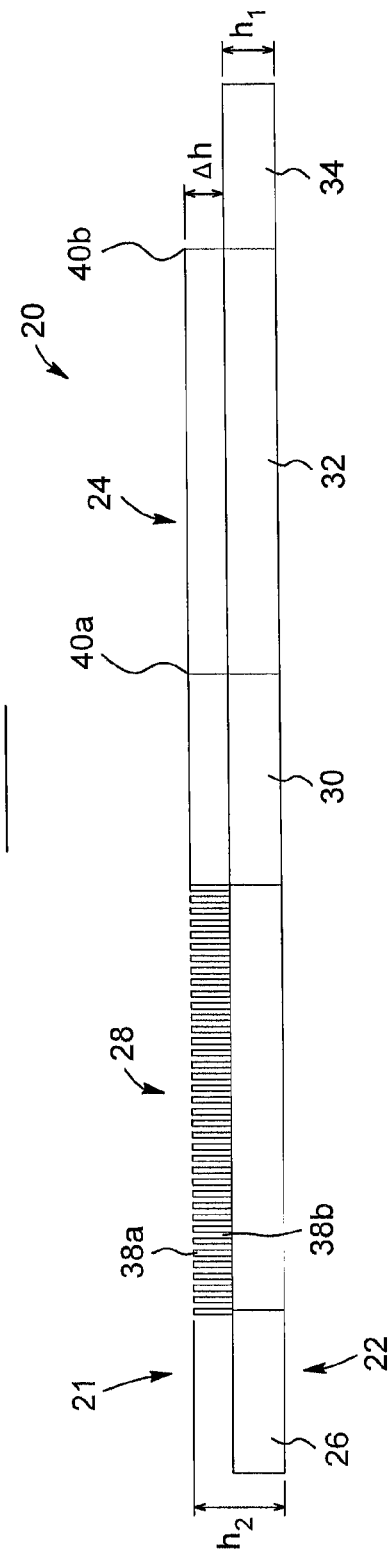
FIG. 2A
FIG. 2B

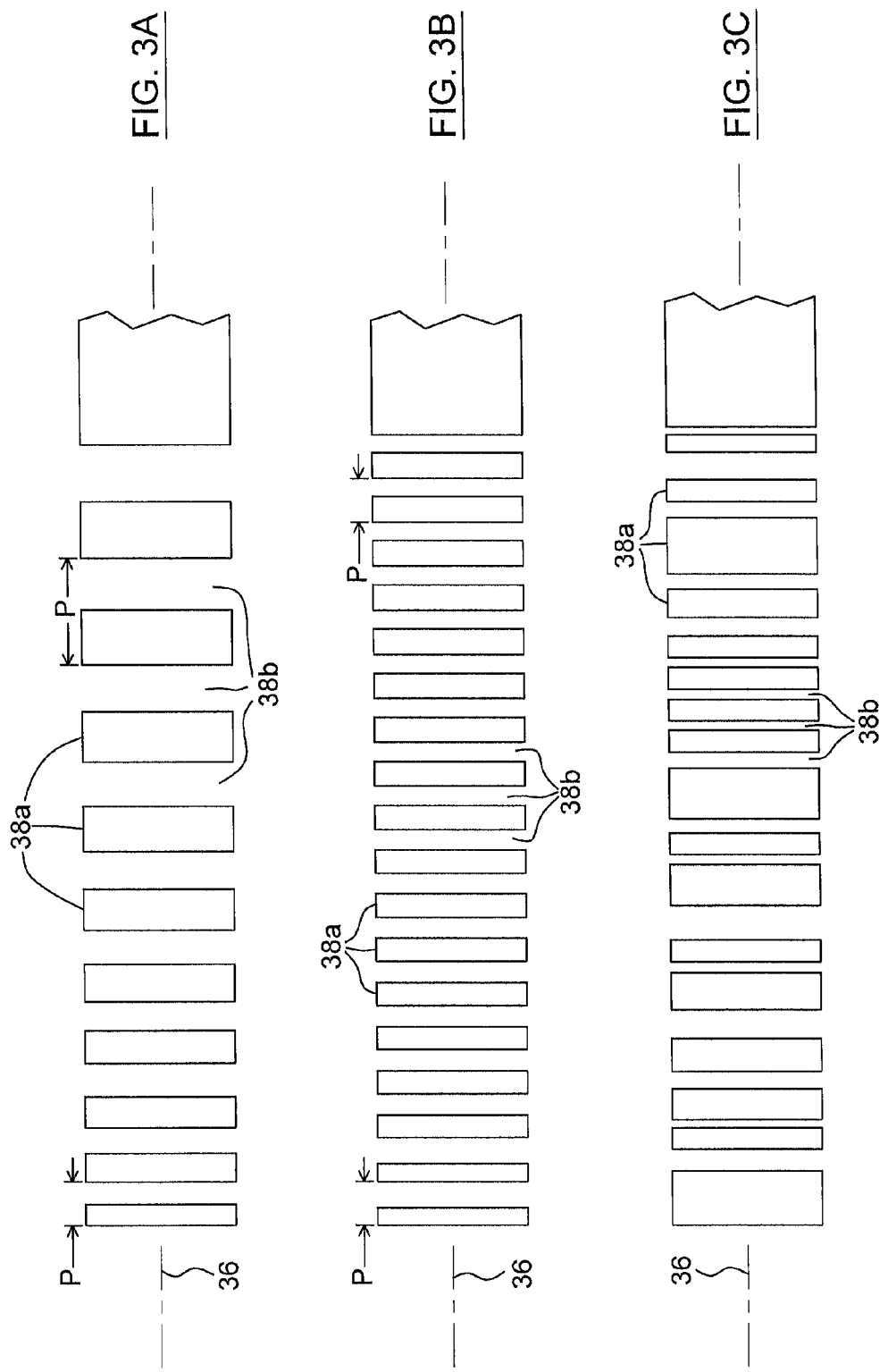

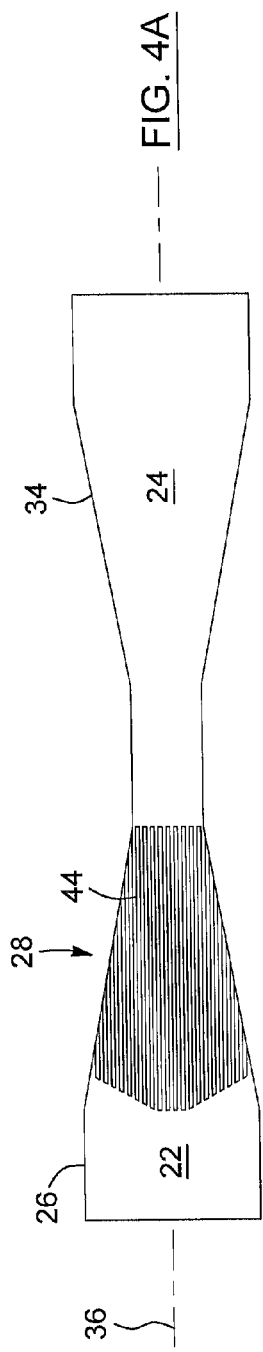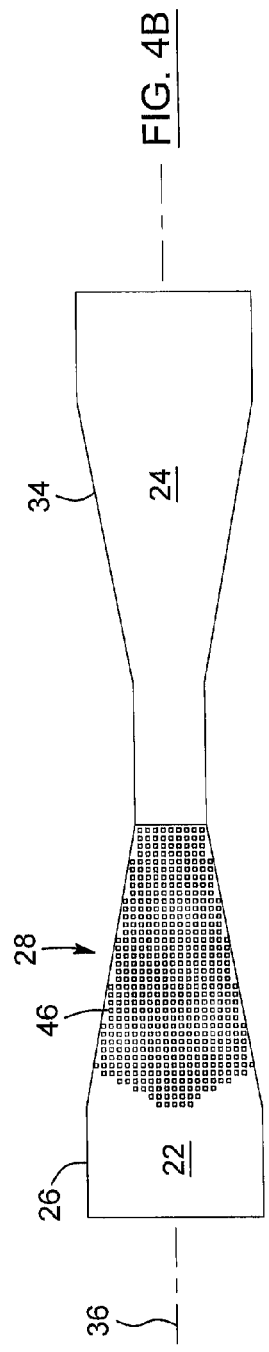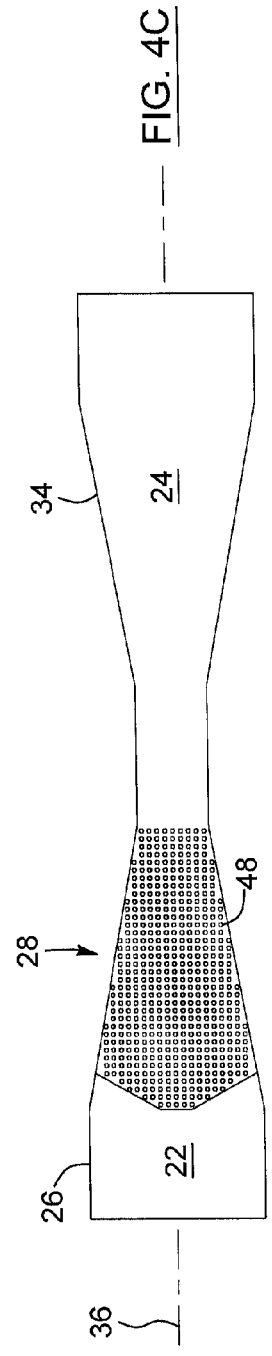

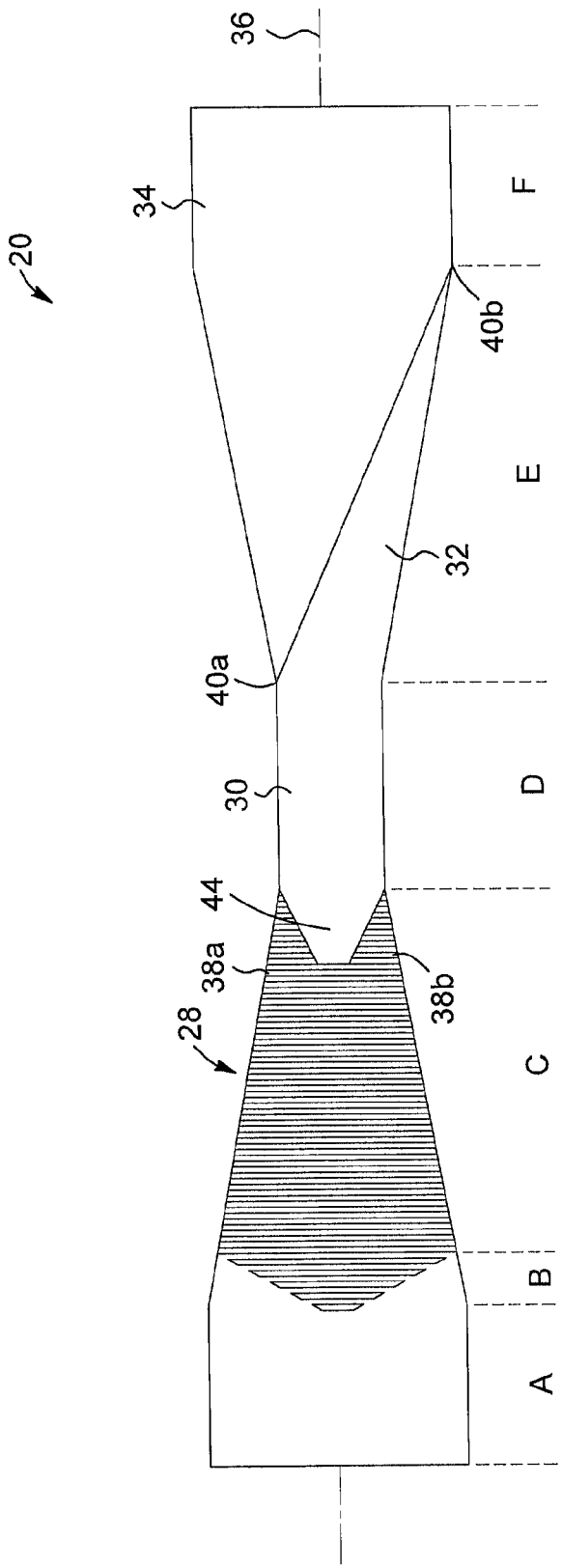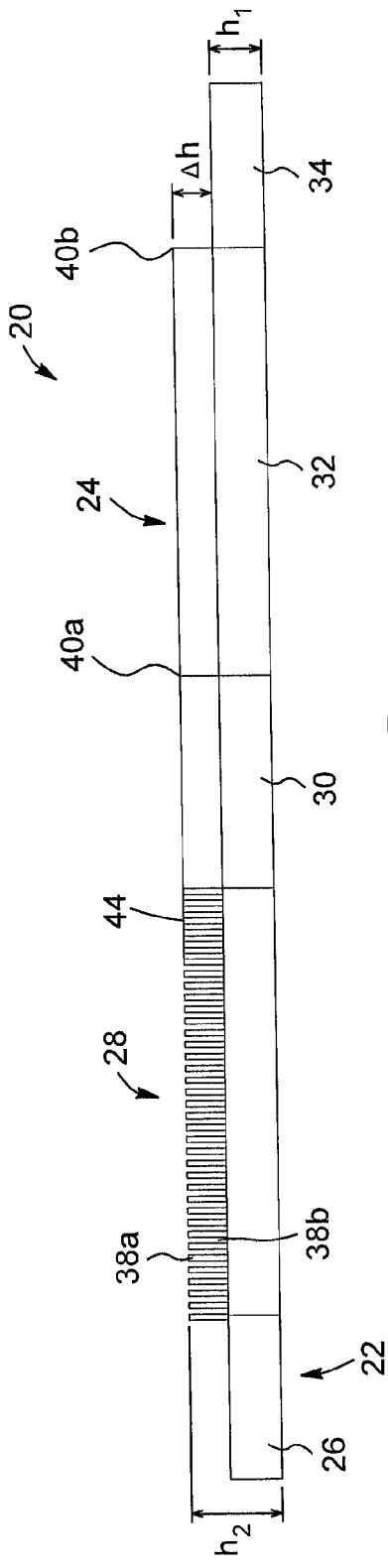
FIG. 8A
FIG. 8B

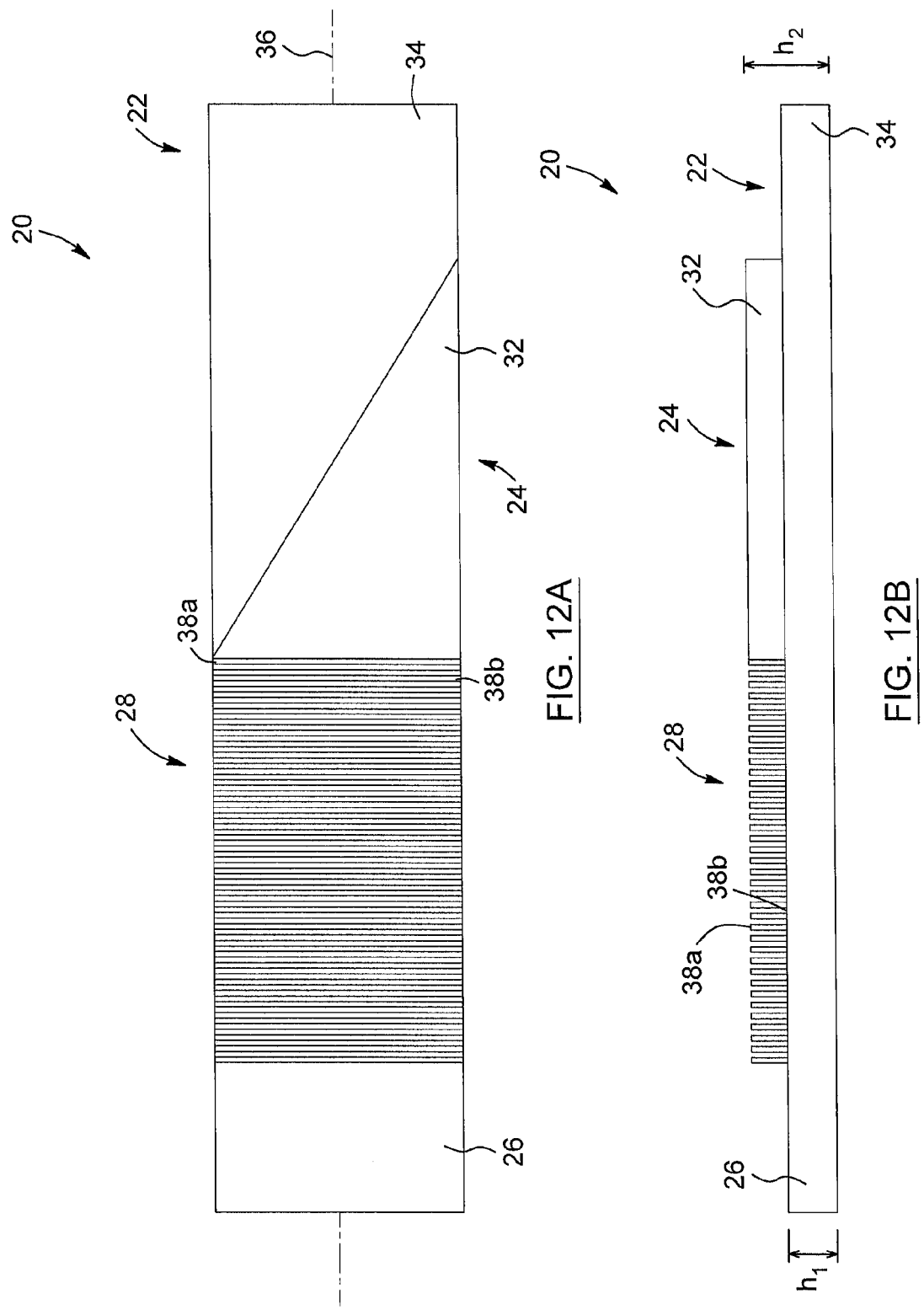

POLARIZATION ROTATOR ASSEMBLY INCLUDING A SUBWAVELENGTH COMPOSITE PORTION

FIELD OF THE INVENTION

The present invention relates to the field of integrated photonic waveguides, and more particularly concerns a polarization rotator assembly for rotating a polarization mode of an electromagnetic signal propagating therealong.

BACKGROUND OF THE INVENTION

Over the past decade, integrated photonics has made important progress in implementing optical and electro-optical devices in silicon for use in various technological applications in fields such as telecommunications, sensing and signal processing. Integrated photonic relies on optical waveguides to implement devices such as optical couplers and switches, wavelength multiplexers and demultiplexers, and polarization splitters and rotators. In particular, integrated photonics based on silicon is a promising candidate for compact integrated circuits due to its compatibility with silicon electronics and standard complementary metal-oxide-semiconductor (CMOS) fabrication methods. The high refractive index contrast between the silicon core and silicon dioxide enables the propagation of highly confined optical modes, which allows scaling integrated photonic waveguides down to submicron level.

One consequence of this high refractive index contrast is that integrated silicon photonic waveguides experience large modal structural birefringence between the two orthogonal transverse electric (TE) and transverse magnetic (TM) fundamental modes of the guided light. Because of this birefringence, integrated photonic waveguides typically exhibit a polarization-dependent behavior. Moreover, since silicon photonic waveguides generally have submicron dimensions and very stringent fabrication tolerance requirements, completely eliminating structural birefringence can prove to be an extremely demanding task.

In order to achieve polarization-independent performance, one may implement a polarization diversity scheme. Generally, polarization diversity is accomplished by using polarization splitters and rotators. In this approach, the two orthogonal TE and TM polarization modes are split in two distinct paths of a polarization diversity circuit. By further rotating the polarization state in one of the paths of the polarization diversity circuit to the orthogonal polarization state, the two paths may be operated in parallel on identical high refractive index contrast waveguide structures. For example, in fundamental-mode silicon waveguides having a certain width and height, it is generally desired to convert the TM polarized signal into a TE polarized signal. Then, as a result of this conversion, only optical functions for the TE modes need to be fabricated and polarization dependence may be eliminated or reduced by using a single polarization (i.e. TE) implementation.

In order for the polarization diversity approach to be practical, on-chip polarization splitters and rotators are desired. However, designing and fabricating integrated waveguide-type polarization rotators can be challenging.

U.S. Pat. No. 7,792,403 to Little et al. (hereinafter LITTLE) discloses a waveguide structure that includes a polarization rotator for rotating the polarization of an electromagnetic signal, preferably by about ninety-degrees. In general, the polarization rotation of the electromagnetic signal by the polarization rotator disclosed in LITTLE is achieved via the geometrical parameters of the polarization rotator. In one embodiment (see, e.g., FIGS. 1 and 2 in LITTLE), the polarization rotator includes an input end, an output end and a midsection extending therebetween and along which polarization rotation is achieved. The midsection has a first and a second level of differing heights and the polarization rotator is referred to as a "bi-level" polarization rotator. The first level of the midsection has a width that decreases along the length of the first level, while the second level has a substantially constant width along the length of the second level.

Waveguide structures such as the one shown in LITTLE can be subject to stringent fabrication tolerances. In particular, it is desirable for the electromagnetic signal to reach the polarization rotation portion in the TM polarization mode in order to be properly rotated. However, vertical taper shapes used to transition between waveguides of different heights can be particularly sensitive to mask alignment during fabrication, and fabrication errors can lead to an undesired pre-rotation of the polarization mode of the guided electromagnetic signal.

There therefore exists a need in the art for an improved polarization rotator assembly for rotating the polarization of light in silicon-based photonic integrated circuits.

SUMMARY

In accordance with one aspect of the invention there is provided a polarization rotator assembly for rotating a polarization mode of an electromagnetic signal.

The polarization rotator assembly includes a waveguiding structure having co-extensive first and second layers. The waveguiding structure has a first height corresponding to the first layer and a second height corresponding to a superposition of the first and second layers. The waveguiding structure has a waveguiding axis and includes successively therealong:
- an input portion formed by the first layer and having a first width;
- a subwavelength composite portion formed by the first and second layers, where the second layer defines a subwavelength pattern having a characteristic feature size which is less than half an effective wavelength of the electromagnetic signal when propagating therein; and
- a polarization rotator portion comprising at least the first and second layers and geometrically configured to rotate a polarization mode of the electromagnetic signal.

Embodiments of the invention may be particularly well adapted for use in submicron silicon-based, fundamental-mode waveguide structures exhibiting polarization-dependent characteristics arising from the large structural modal birefringence between the TE and TM fundamental modes.

Other features and advantages of the invention will be better understood upon reading of preferred embodiments thereof with reference to the appended drawings.

BRIEF DESCRIPTION OF THE DRAWINGS

FIGS. 2A and 2B are schematic top and side elevation views, respectively, of the polarization rotator assembly of FIG. 1.

FIG. 3A to 3C show different subwavelength patterns which for the subwavelength composite portion of a polarization rotator assembly, respectively having a variable period (FIG. 3A), a variable duty cycle (FIG. 3B) and an aperiodic profile (FIG. 3C).

FIGS. 4A to 4C show waveguiding structures where the subwavelength composite portion is defined by longitudinal corrugations (FIG. 4A), by pillars projecting from the first layer (FIG. 4B) and by holes extending through the second layer (FIG. 4C), respectively.

FIGS. 8A and 8B are schematic top and side elevation views, respectively, of the polarization rotator assembly of FIG. 7.

FIGS. 12A and 12B are schematic top and side elevation views, respectively, of the polarization rotator assembly of FIG. 11.

DESCRIPTION OF PREFERRED EMBODIMENTS

In accordance with an aspect of the invention, there is provided a polarization rotator assembly. The polarization rotator assembly allows rotating a polarization state or mode of an electromagnetic signal as the electromagnetic signal propagates therethrough.

Polarization rotator assemblies according to embodiments of the invention can be generally useful in silicon-based integrated photonics or other high index contrast photonics applications, preferably as part of on-chip polarization-diversity circuits implemented for eliminating the polarization dependence in devices based on photonic waveguides. In particular, embodiments of the invention may be particularly well adapted for use in submicron silicon-based, fundamental-mode waveguide structures exhibiting polarization-dependent characteristics arising from the large structural modal birefringence between the TE and TM fundamental modes. In such embodiments, the polarization rotator assembly is preferably operatively configured to rotate the polarization of an electromagnetic signal by ninety degrees. More precisely, to convert a TM polarized signal to its orthogonal counterpart, namely a TE polarized signal or vice versa. The electromagnetic signal may be a telecommunication signal encoded with information according to one of many known modulation schemes or may be embodied by any other optical beam whose polarization is to be rotated. It will be readily understood that polarization rotator assemblies as described herein may be used in different contexts than those mentioned above without departing from the scope of the present invention.

Figure 1:
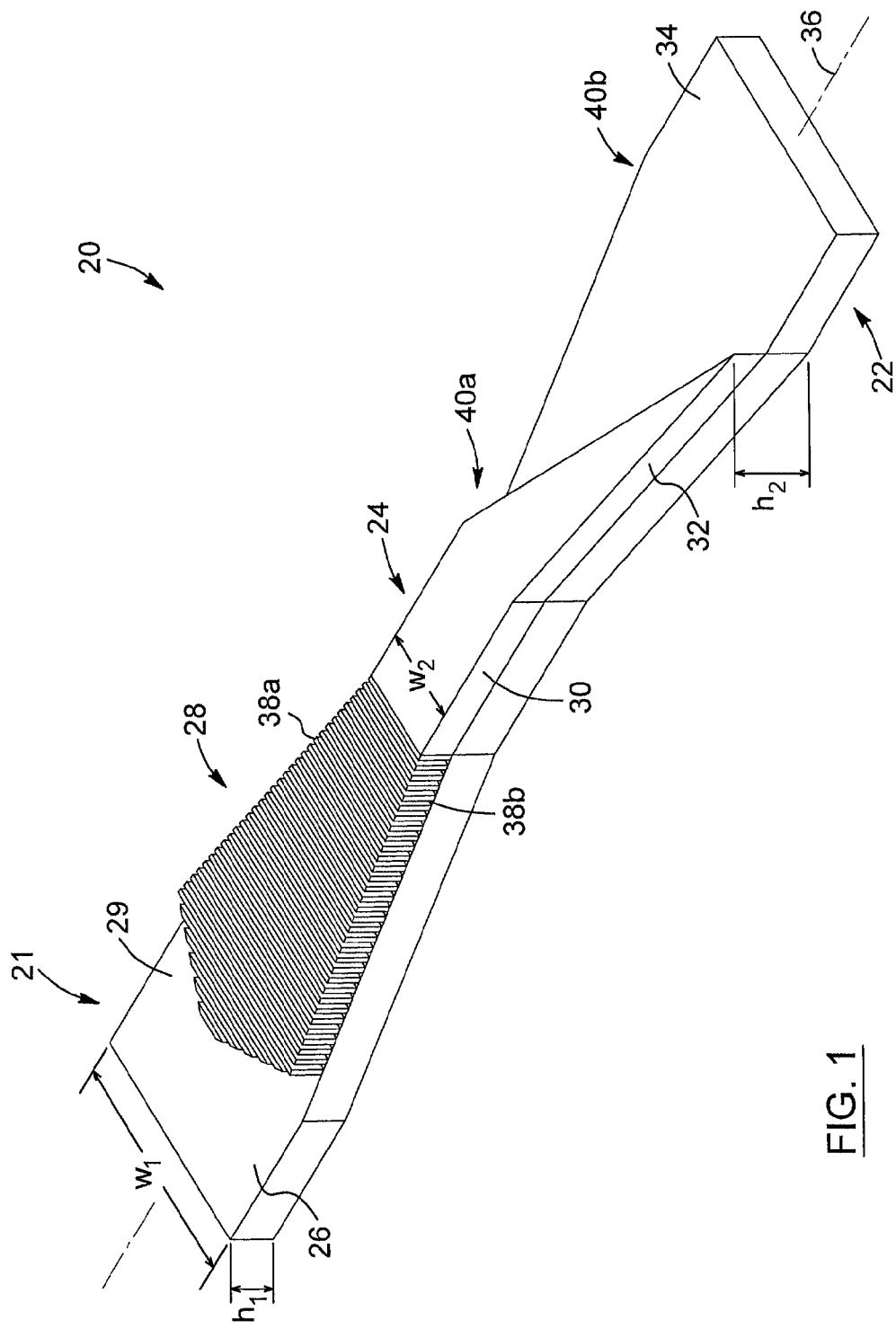
FIG. 1 is a schematic perspective view of a polarization rotator assembly in accordance with an embodiment of the invention.

Referring to FIGS. 1, 2A and 2B, there are shown perspective, top and side elevation views of a polarization rotator assembly 20, in accordance with an embodiment of the invention.

The polarization rotator assembly 20 first includes a waveguiding structure 21, which is substantially planar and includes two co-extensive layers 22 and 24. The waveguiding structure 21 allows guiding of an electromagnetic signal along a waveguiding axis 36. The thickness profile of the waveguiding structure is characterized by a first height $h_1$, corresponding to the first layer 22, and a second height and $h_2$, which correspond to the superposition of the first and second layers 22 and 24. The first and second layers 22 and 24 therefore define a level difference $\Delta h = h_2 - h_1$ therebetween. The heights $h_1$ and $h_2$ may be selected so that the ratio of $h_2$ and $h_1$ is of the order of two. Additionally or alternatively, the heights $h_1$ and $h_2$ may be selected so as to achieve substantially fundamental-mode (e.g. TE and TM) operation for a given waveguide width.

It will be understood that the first and second layers 22 and 24 form the core of the waveguiding structure 21, inside which the electromagnetic signal is guided. In the illustrated embodiment, the waveguiding structure 21 is a strip waveguide, but other appropriate structures could be used in other embodiments including a ridge waveguide and a rib waveguide. The core material forming the first and second layers 22 and 24 is preferably silicon having a refractive index of about 3.5 at a wavelength of 1.55 µm, but other core materials could be envisioned including silicon nitride, silicon carbide, indium phosphide, gallium arsenide, high-index polymers and the like. In some embodiments both the first and second layers may be made of a same material, whereas in other embodiments they may each be made of different ones of the materials listed above.

The first and second layers 22 and 24 of the polarization rotator assembly 20 may be defined using any common, preferably CMOS-compatible, photolithographic processes. As known in the art, such processes may involve thin-layer deposition, selective photoresist mask etching and patterning, and oxidation. For example, the polarization rotator assembly 20 may be formed using two masks and two etching steps. Optionally, a cladding material (not shown) may be deposited over the polarization rotator assembly 20. The cladding material is preferably silicon dioxide (silica) having a refractive index of 1.45 at a wavelength of 1.55 µm, but other appropriate materials could alternatively or additionally be used.

Broadly described, the waveguiding structure 21 of the polarization rotator assembly 20 illustrated in FIGS. 1, 2A and 2B includes an input portion 26, a subwavelength composite portion 28, a buffer zone 30, a polarization rotator portion 32 and an output portion 34, which extend successively along the waveguiding axis 36. The polarization rotator assembly 20 of this embodiment may also be conceptually divided into six distinct sections, labeled A to F, which extend between the input portion 26 and the output portion 34.

In operation, an electromagnetic signal propagating along the propagation axis 36 preferably enters the polarization rotator assembly 20 via the input waveguide portion 26, which defines section A of the polarization rotator assembly 20. Preferably, the electromagnetic signal is already polarized into one of the TM and TE polarized modes upon entering the input waveguide portion 26. As known in the art, in a polarization diversity scheme, the TE and TM polarization may first be spatially separated in two different waveguides. One of the TE and TM polarized signals may then be rotated through ninety degrees to yield two parallel circuits propagating in the same polarization mode. For example, the polarization rotator assembly 20 shown in FIGS. 1, 2A and 2B may be configured to receive a TM polarized signal and convert the same into a TE polarized signal.

The geometrical parameters of the input waveguide portion 26 (e.g. height and width) may be selected to ensure substantially single-mode propagation along the polarization rotator assembly 20 and to facilitate matching between the polarization rotator assembly 20 and other connecting waveguide elements disposed on the upstream side thereof. In the example of FIGS. 1, 2A and 2B, the input portion 26 is formed solely by the first layer 22 and has first width $w_1$, which is constant along the waveguiding axis 36, therefore defining a rectangular shape.

With continued reference to FIGS. 1, 2A and 2B, after passing through the input portion 26, the electromagnetic signal enters the subwavelength composite portion 28 for propagation therealong. The subwavelength composite portion 28 is formed by the first and second layers 22 and 24, and the second layer 24 defines a subwavelength pattern.

As used herein, the term "subwavelength" refers to the fact that the size of the characteristic features or inhomogeneities (typically, corrugation periodicity) of the subwavelength pattern are markedly smaller than half of the wavelength of the electromagnetic signal propagating thereinside. When the wavelength of the electromagnetic signal propagating within the subwavelength composite portion is large compared to the characteristic feature size thereof, the structure can be treated as an effective homogeneous material. This condition is generally met when the characteristic feature size of the subwavelength pattern (typically the periodicity of the corrugations) is less than half the wavelength of the electromagnetic signal propagating therein.

In the illustrated embodiment of FIGS. 1, 2A and 2B, the subwavelength pattern is a one-dimensional corrugated grating and therefore includes a series of corrugations 38a formed by the second layer 22 and distributed along the waveguiding axis 36 and transverse thereto. The series of corrugations 38a is interleaved with a series of gaps 38b where portions of the second layer are absent. The corrugations 38a are typically made of a core material such as silicon, and the gaps 38b between the corrugations 38a may be air or be filled by a cladding material such as silica.

It will be understood that, in this embodiment, the characteristic feature size of the subwavelength pattern corresponds to the length of one corrugation 38a and one adjacent gap 38b, the sum of which represents the period of the pattern. Hence, in order for the pattern to be considered "subwavelength", the transverse size and separation of corrugations should be on a subwavelength scale along the length of the subwavelength composite portion 28, to ensure that resonance and filtering effects typically observed with Bragg gratings or other periodic structures are suppressed. The subwavelength composite portion 28 therefore acts as a homogeneous medium with an effective refractive index whose value is between those of the corrugations (e.g. core material) and the separation between them (e.g. air or cladding material).

The subwavelength pattern may be formed by selective etching or deposition of the second layer 24. In the illustrated embodiment of FIGS. 1, 2A and 2B, the series of corrugations is shown as having a fixed period and a fixed duty cycle. As mentioned above the period of the corrugations corresponds to the length, along the propagation axis 26, of one corrugation and one adjacent gap. The term "duty cycle" is understood to refer to the ratio of the corrugation length to the period of the subwavelength pattern. It will however be understood that in other embodiments, the period and/or the duty cycle of the series of corrugations may be variable. For example, FIG. 3A illustrates a pattern of corrugations 38a where the period of the series of corrugations is variable, shown here as increasing progressively by way of example. The duty cycle may also be selected in order to tailor the effective refractive index $n_{eff}$ of the subwavelength composite portion 28. For example, referring to FIG. 3B, a duty cycle variation along the waveguiding axis 36 may be implemented in order to taper a difference in refractive index between the input and output ends of the subwavelength composite portion 28. In the illustrated example, the duty cycle is shown as increasing from 0.4 to 0.6 while the period remains fixed. The choice of the period and duty cycle may also be influenced by other factors of fabrication and design rules.

It is to be noted, however, that the subwavelength pattern of the subwavelength composite portion 28 need not be periodic, as long as the characteristic feature size thereof remains below the diffraction limit. By way of example, FIG. 3C shows a series of corrugations having an aperiodic, even random, profile, as may be used for the subwavelength pattern in some embodiments of the polarization rotator assembly.

Additionally, the subwavelength pattern may be defined by features differing from the transversely disposed series of gaps and corrugations illustrated in FIGS. 1, 2A, 2B, and 2A to 3C. For example, Referring to FIGS. 4A to 4C, in other embodiments the subwavelength pattern of the subwavelength composite portion 28 may be embodied by: longitudinal corrugations 44 parallel to the waveguiding axis 36 (FIG. 4A); a periodic or aperiodic array of arbitrarily-shaped pillars 46 of height Δh formed by the second layer 24 and projecting upwardly from the first layer 22 (FIG. 4B); or a periodic or aperiodic array of arbitrarily-shaped holes 48 of depth Δh extending through the second layer 24 (FIG. 4C). It will be understood that any combination of two or more of the above cases may be envisioned, as well as subwavelength corrugations patterned on more than one layer, combined with one or more layers without corrugations.

Figure 11:
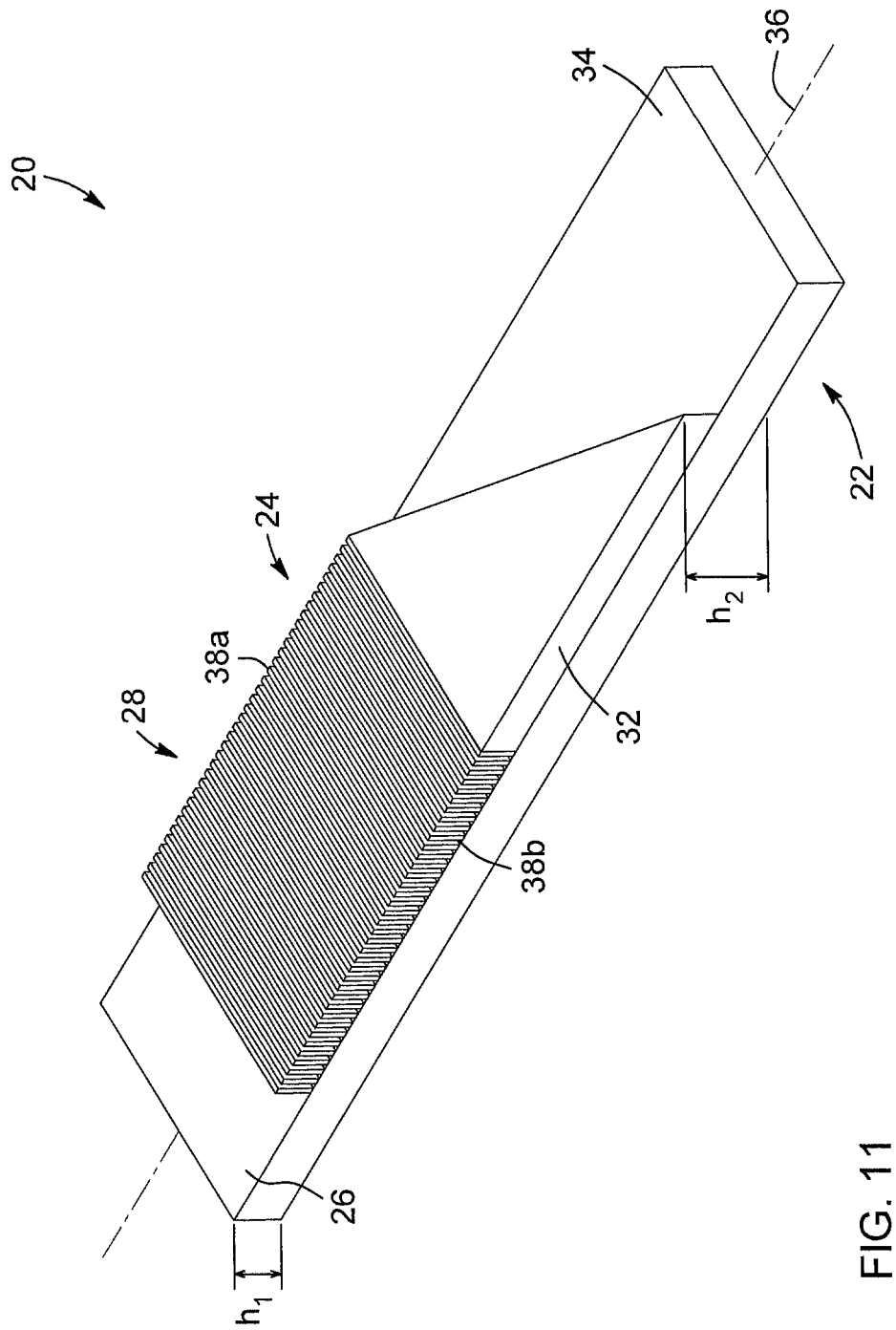
FIG. 11 is a schematic perspective view of a polarization rotator assembly in accordance with another embodiment where the subwavelength composite portion has a constant width.

Referring back to FIGS. 1 and 2A, the subwavelength composite portion 28 can be seen as tapering down from the first width $w_1$ to a second width $w_2$. This width reduction can be designed such that, at each point along the axis, the periodicity of the pattern remains small enough to satisfy the subwavelength condition. However, in other embodiments the width of the subwavelength composite portion 28 could remain constant, as for example shown in the illustrated embodiment of FIGS. 11, 12A and 12B.

Optionally, the subwavelength pattern may include a wedge-shaped section 29 forming a longitudinally widening taper along the waveguiding axis 36, shown in section B of the illustrated embodiment of FIGS. 1, 2A and 2B. In the illustrated embodiment, the wedge-shaped section 29 defines a width taper to facilitate matching of the TM polarized signal between the input portion 26 and the subwavelength composite portion 28. The wedge-shaped section 29 of the subwavelength composite portion 28 may advantageously allow reducing optical losses at the junction between sections A and B without inducing a rotation of the polarization of the electromagnetic signal when considering the fabrication standard deviation inherent to mask alignment. Also advantageously, the wedge-shaped section 29 may compensate for the minimum feature size allowed by the fabrication process, which may limit the minimum and maximum achievable values for the duty cycle of the subwavelength pattern. The slope of the width taper may be fixed or not, and may be designed for generating an adiabatic taper or not. It will be understood that providing a width taper at one end of the subwavelength composite portion is optional and need not be included in some embodiments.

It will thus be understood that the subwavelength composite portion 28 advantageously acts as a vertical mode converter between two waveguide elements defining a level difference Δh therebetween. In addition, the polarization of the electromagnetic signal propagating in the subwavelength composite portion 28 remains substantially unaffected by fabrication tolerance issues since the polarization rotation is negligible therealong.

Figure 6:
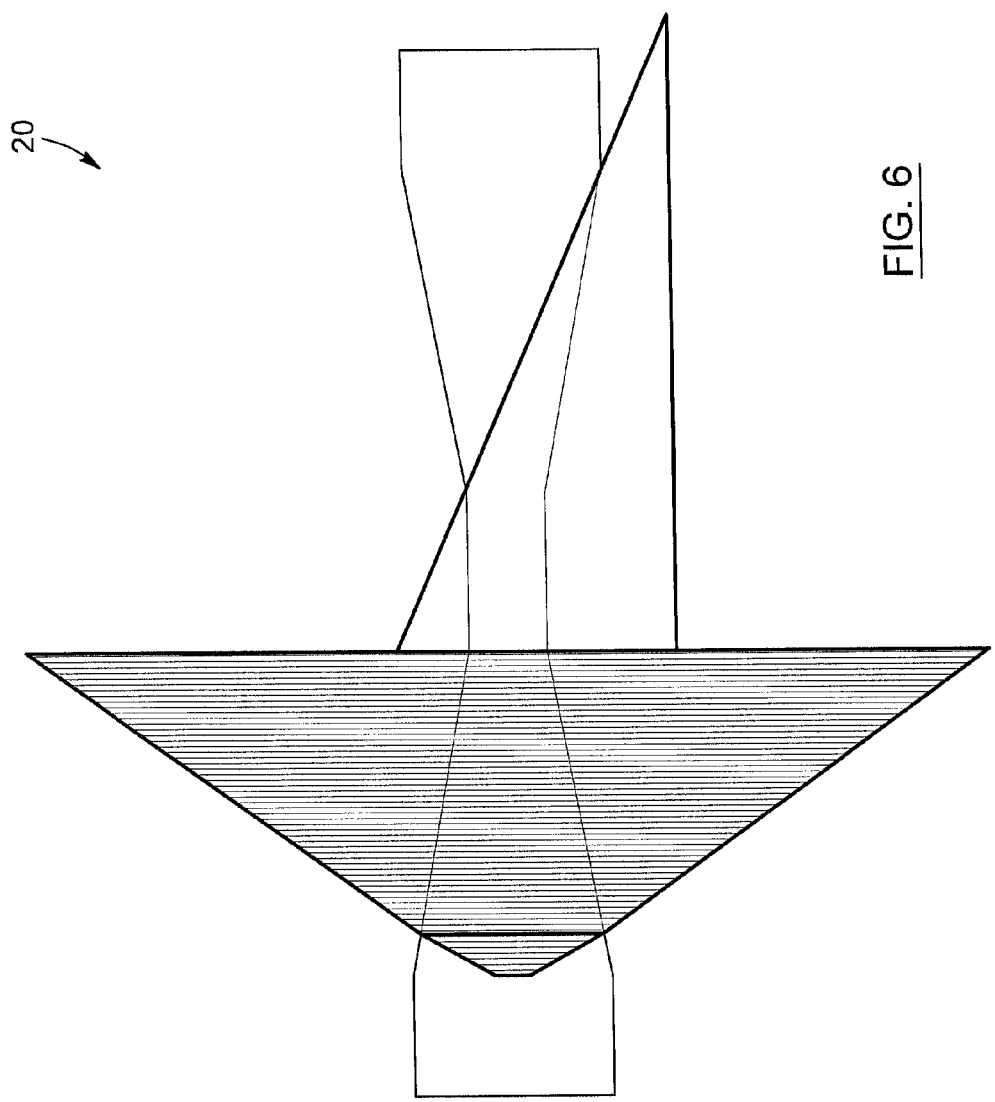
FIG. 6 is a schematic top view of a mask configuration suitable for patterning the waveguiding structure of the polarization rotator assembly of FIG. 1.

Still referring to FIGS. 1, 2A and 2B, the waveguiding structure 21 of the polarization rotator assembly 20 may optionally further include a buffer zone 30, formed by the superposition of the first and second layers and therefore of height $h_2$. The buffer zone 30 is disposed between the subwavelength composite portion 28 and the polarization rotator portion 32. The buffer zone 30 corresponds to the section D of the illustrated polarization rotator assembly 20. The buffer zone 30 may be provided to avoid an undesirable overlap of the sections C and E during the fabrication of the polarization rotator assembly 20, which could arise as a result of vertical or horizontal misalignment (e.g. of the order of 50 nm) of the masks used to define the first and second layers 22 and 24. In this regard, FIG. 6 illustrates a top view of a schematic representation of a mask configuration suitable for patterning the two vertically-spaced layers of an embodiment of the polarization rotator assembly. However, it will be understood that the buffer zone 30 need not be provided and may thus be omitted in other embodiments as for example shown in FIGS. 11, 12A and 12B.

Figure 7:
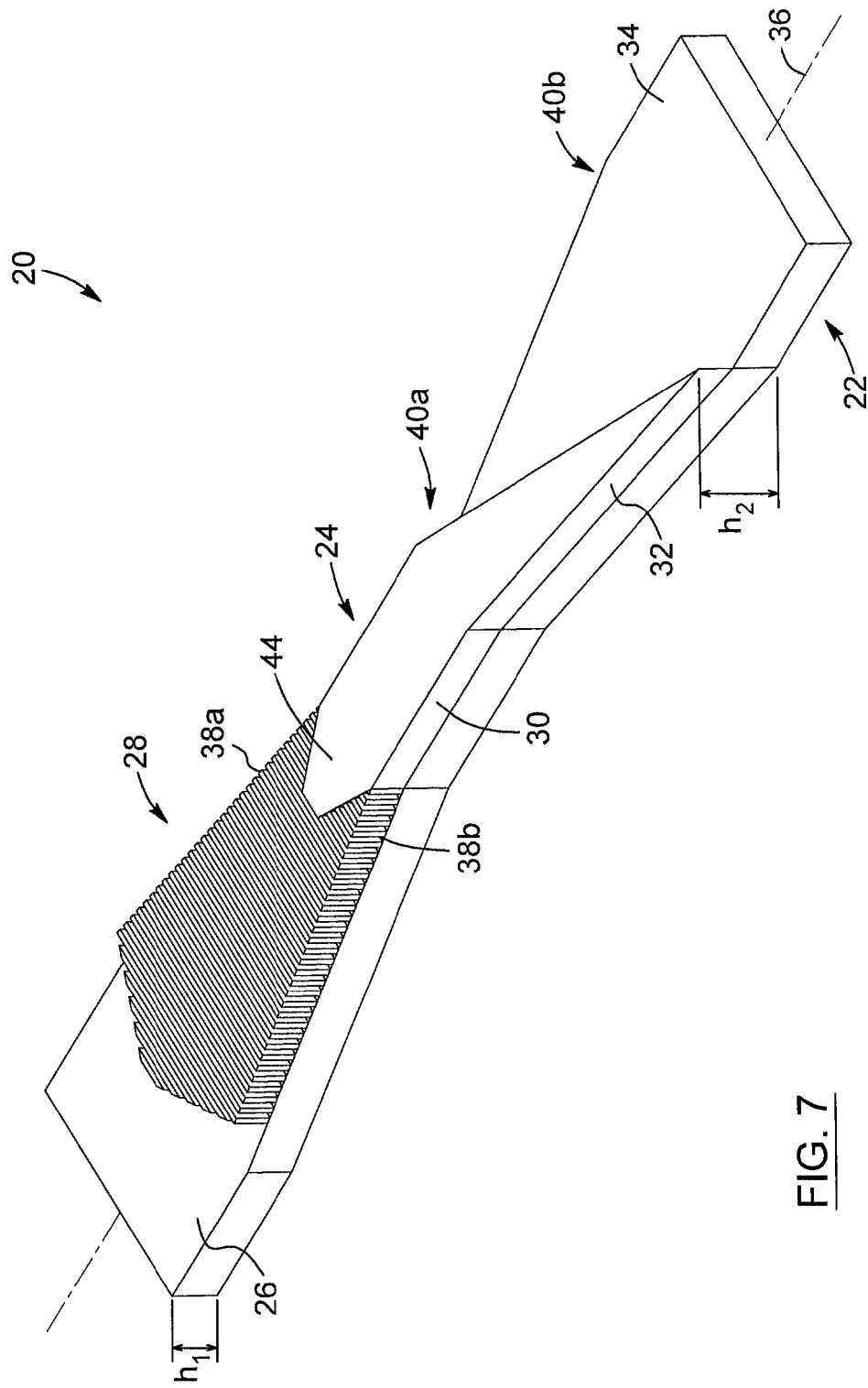
FIG. 7 is a schematic perspective view of a polarization rotator assembly in accordance with an embodiment of the invention, including a buffer zone having an input width taper that extends into the output end of the subwavelength composite portion.

Referring to FIGS. 7, 8A and 8B, in some embodiments, the buffer zone may include an input width taper 44 that extends into the output end of the subwavelength composite portion 28. This input width taper 44 may provide a smoother transition between sections C and D of the polarization rotator assembly 20, as well as reduce optical losses at the junction between sections C and D.

Referring back to FIGS. 1, 2A and 2B, the waveguiding structure 21 of the polarization rotator assembly 20 also includes a polarization rotator portion 32. The polarization rotator portion 32 includes the first and second layers 22 and 24 and is geometrically configured to rotate the polarization mode of the electromagnetic signal.

The polarization rotator portion may have any configuration which allows the rotation of at least one polarisation mode of the electromagnetic signal propagating in the waveguiding structure 21. In the illustrated embodiment of FIGS. 1, 2A and 2B, the polarisation rotation is based on the level difference Δh between the first and the second heights $h_1$ and $h_2$. In the illustrated embodiment, the electromagnetic signal is receiving by the polarization rotating portion as it exits the buffer zone 30, although in other embodiments the electromagnetic signal may propagate directly from the subwavelength composite portion 28 to the polarization rotation portion 32.

Preferably, the polarization rotation portion 32 is configured to rotate the polarization of the electromagnetic signal by ninety degrees. Further preferably, the polarization rotation portion 32 is configured to convert a TM polarized signal to TE polarized signal which is its orthogonal counterpart or vice versa.

In the embodiment shown in FIGS. 1, 2A and 2B, the polarization rotation of the electromagnetic signal is achieved via a change in the geometry of the first and second layers 22 and 24 along the polarization rotating portion 32. In the illustrated embodiment, the polarization rotating portion 32 has an input end 40a and an output end 40b. The width of the second layer 24 along the waveguiding axis 36 decreases from the input end 40a to the output end 40b, whereas the width of the first layer 22 along the waveguiding axis 36 increases from the input end 40a to the output end 40b of the polarization rotating portion 32. It will be understood that in other embodiments, the width of the first layer 22 may alternatively be kept constant. In addition, other configurations of polarization rotators geometrically configured for polarization rotation based on the level difference Δh between the first and second layers 22 and 24 may be envisioned without departing from the scope of the present invention.

Figure 9:
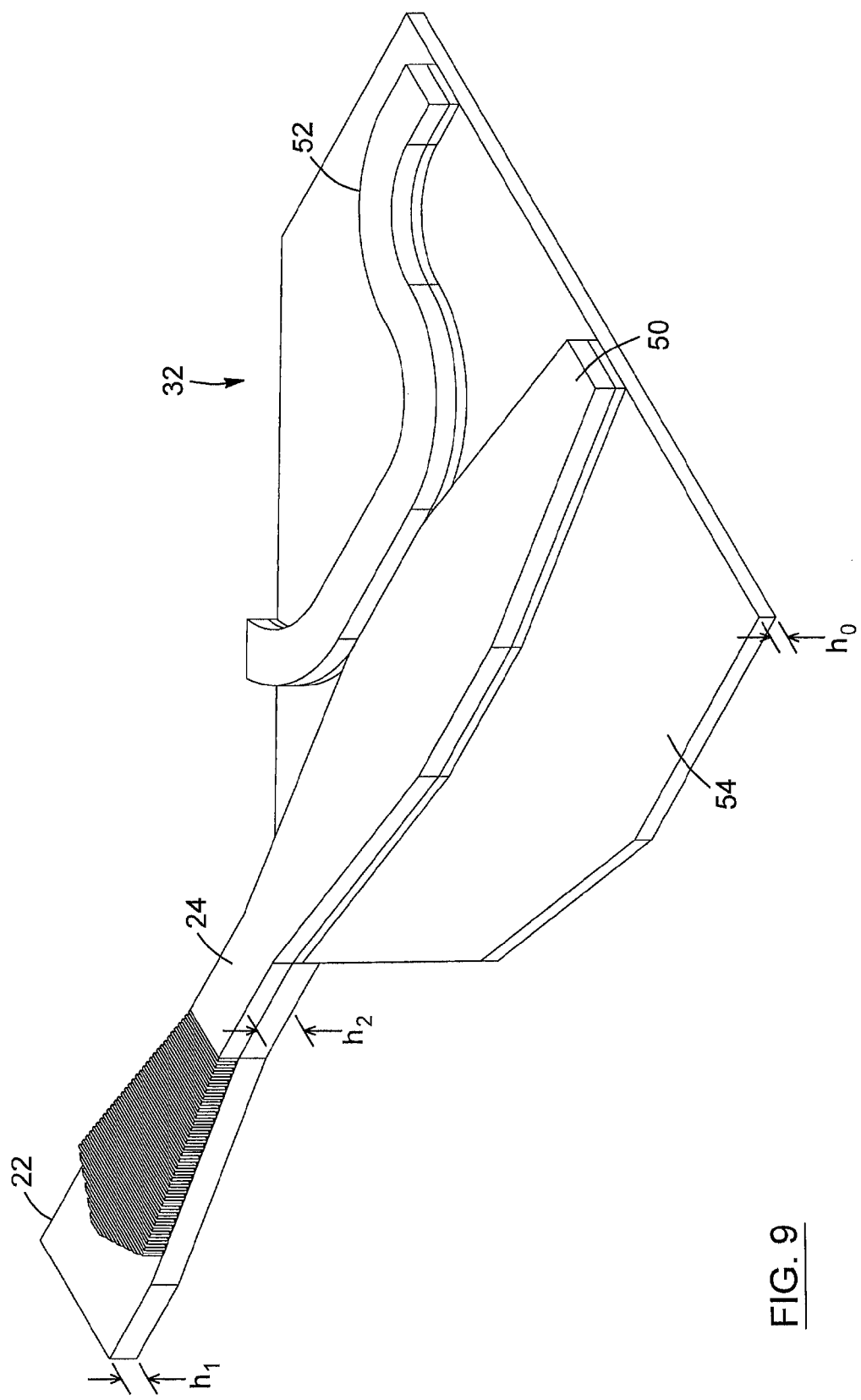
FIG. 9 is a schematic perspective view of a polarization rotator assembly in accordance with another embodiment where the polarization rotating portion includes polarization rotating and polarization maintaining paths.
Figure 10A:
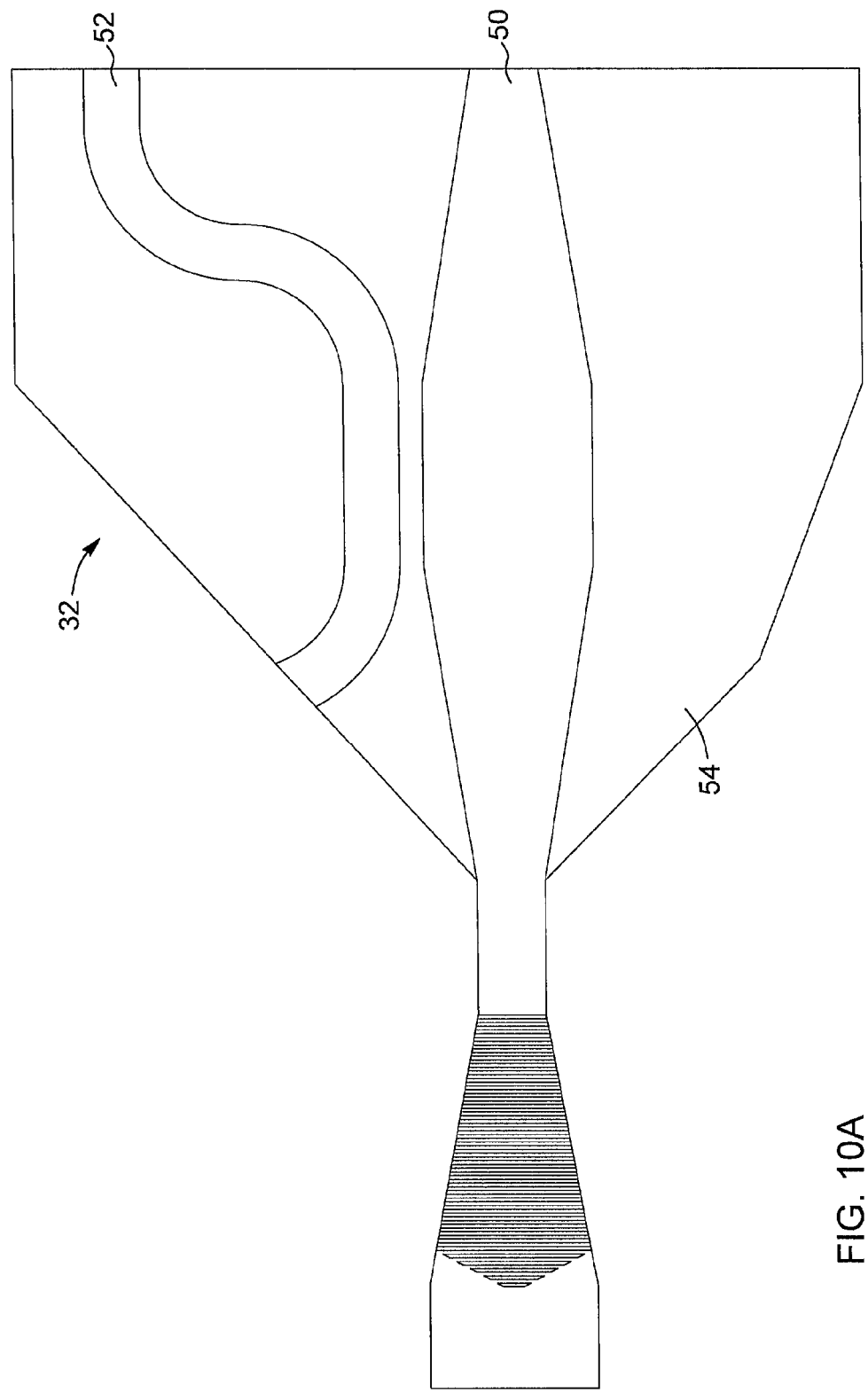
FIGS. 10A and 10B are schematic top and side elevation views, respectively, of the polarization rotator assembly of FIG. 9.
Figure 10B:
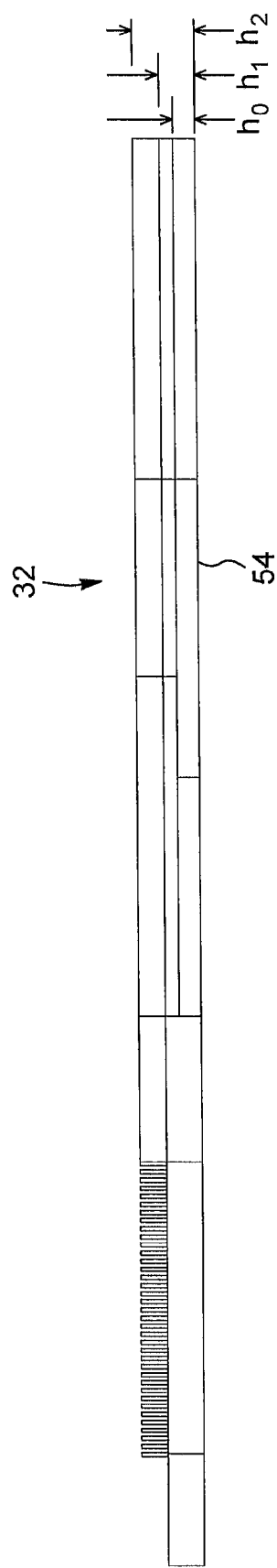

Referring to FIGS. 9, 10A and 10B an alternative configuration for the polarization rotator portion 32 is shown. In this example, the polarization rotation portion 32 includes a polarization-rotating path 52 and a polarization-maintaining path 50, both at the second height $h_2$. Wing-shaped ribs 54 made of a waveguiding layer of a height $h_0$ smaller than $h_1$ extend on either side of the first and second layers 22 and 24. The polarization rotating portion 32 is geometrically configured to split the electromagnetic signal into two signal polarization components respectively guiding along the polarization maintaining and rotating paths 50 and 52. For example the electromagnetic signal may be split into the TE mode, which remains guided along the waveguiding axis 26 and the polarization-maintaining path 50, while the TM mode is coupled into the polarization-rotating path 52 which rotates it by 90 degrees, both paths therefore output light in the TE mode.

Of course, numerous examples of polarization rotating structures based on similar principles can be found in the art.

Finally, waveguiding structure 21 of the polarization rotator assembly 20 preferably includes the output portion 34 for receiving the electromagnetic signal exiting the polarization rotating portion. The output portion 34 defines the section F of the illustrated polarization rotator assembly 20. As with the input portion 26, the geometrical parameters of the output waveguide portion 34 (e.g. height and width) may be selected to ensure substantially single-mode propagation along the polarization rotator assembly 20 and to facilitate matching between the polarization rotator assembly 20 and other connecting waveguide elements disposed on the downstream side thereof. In the embodiment of FIGS. 1, 2A and 2B, the output waveguide portion 34 is defined by the first layer 22 and therefore has a same height $h_1$ and width $w_1$ to ensure good propagation of the fundamental TE mode without significant excitation of higher-order modes. The output portion may also include a subwavelength composite structure acting as a mode converter to provide a transition between waveguiding structures at different heights. For example, in the polarization rotating assembly illustrated in FIGS. 9, 10A and 10B, both the polarization maintaining and the polarization rotating paths end at a the second height $h_2$; an output portion including a vertical mode converter (not shown) at each path output may be used in order to couple light back into an output waveguide of height $h_1$. The vertical output converter may for example be embodied by a structure similar to the one of the subwavelength composite portion, used in reverse.

One skilled in the art will understand that the enclosed drawings are not drawn to the typical scale of such devices. The polarization rotator assembly may have dimensions and proportions according to requirements and limitations of a particular application. For example, polarization rotators assembly having a configuration similar to the one shown in FIGS. 1, 2A and 2B were fabricated where $h_1$=220 nm and $h_2$=380 nm, resulting in a level difference Δh=160 nm. In this embodiment, the width and height, characterizing the waveguiding structure 21 along the input portion were 500 nm and 220 nm respectively, to ensure single-mode propagation for each TE and TM polarizations. In section C, the width of the corrugations (i.e. the width of the second layer 24) decreased along the length of the subwavelength composite portion 28 in the same manner as the width of the first layer 22, such that at the end of section C, the subwavelength composite structure 28 has a second width of 220 nm. The period of the subwavelength corrugated grating was 300 nm. The duty cycle in section B is 0.40, that is, the length of the corrugations (along the waveguiding axis) was 120 nm and their separation 180 nm. Preferably, the length of the corrugations is selected so as to correspond to the minimum feature size allowed by the fabrication process utilized. For example, the first corrugation at the entrance of the input end of the subwavelength composite portion 28 corresponds to a 120× 120×160 nm³ pillar. Moreover, the duty-cycle of the subwavelength pattern increased gradually from 0.40 to 0.60, thus creating a smoother transition for the TM polarized signal entering the subwavelength composite structure from a waveguide having a height of 220 nm and a width of 500 nm to a waveguide having a height of 380 nm and a width of 220 nm.

Figure 5A:
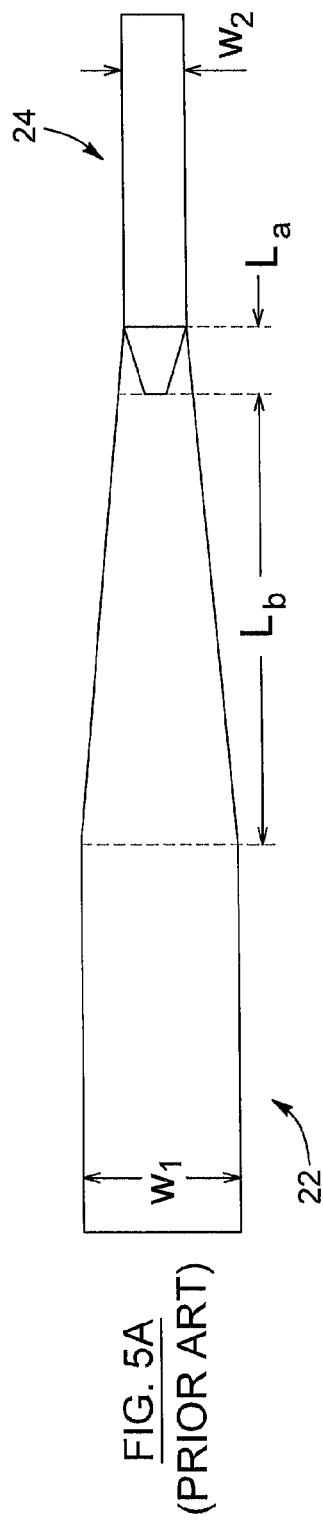
FIGS. 5A to 5C are schematic representations of various vertical taper geometries on integrated photonic waveguides, namely a conventional vertical taper (FIG. 5A—PRIOR ART); a subwavelength composite structure having corrugations only (FIG. 5B) and corrugations with an input width taper (FIG. 5C).
Figure 5B:
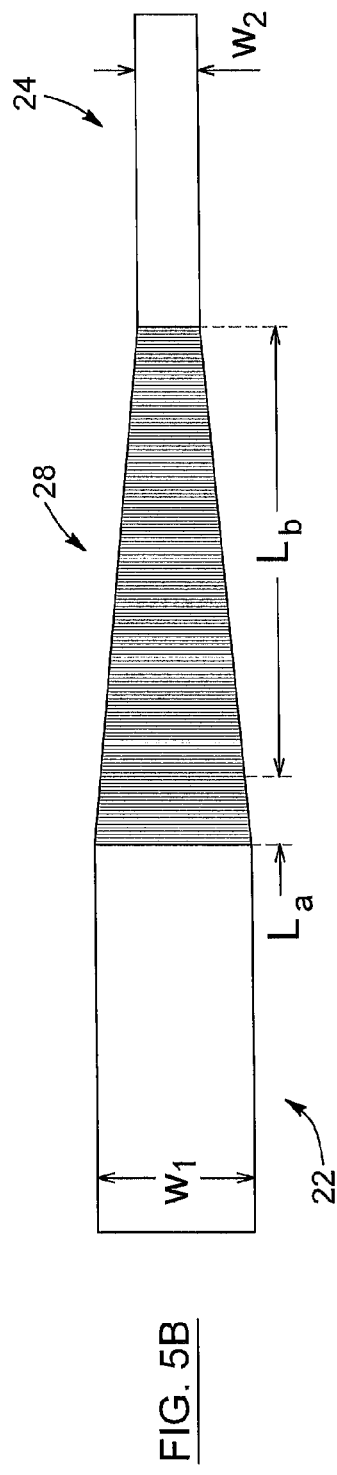
Figure 5C:
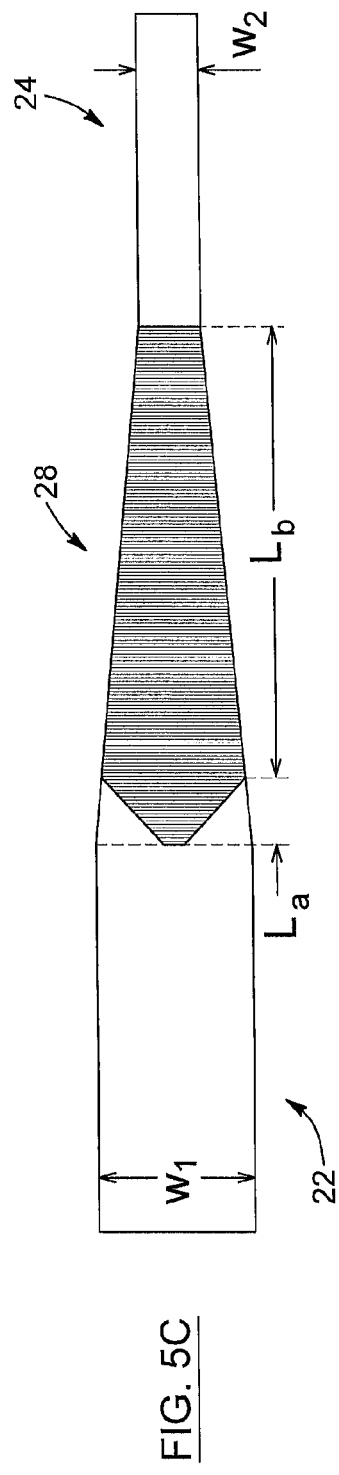

FIGS. 5A to 5C are schematic representations of various vertical taper geometries on integrated photonic waveguides. In FIG. 5A (PRIOR ART), the vertical taper is a conventional vertical taper equivalent to the one provided in LITTLE. In FIGS. 5B and 5C, the vertical taper is respectively embodied by a subwavelength pattern without and with a wedge-shaped section. The parameters indicated in FIGS. 5A to 5C, having the following values: $w_1$=500 nm, $w_2$=220 nm, $L_a$=5 μm, $L_b$=40 μm. The first layer 22, has been considered as having a height $h_1$=220 nm and the second layer 24 has a height $h_2$=380 nm. The table below provides information regarding the TM mode insertion loss (IL) and the polarization extinction ratio (PER) for the structure shown in FIGS. 5A to 5C subjected to typical mask transversal misalignment of 50 nm of the first layer 22 relative to the second layer 24. The data provided in the table were obtained via a finite-difference time-domain (FDTD) numerical simulation. One would observe that the conventional vertical taper depicted in FIG. 5A suffers from a non-negligible IL of −1.8 dB and experience a PER degradation well below 15 dB, a level that could be seen as a device with good PER performance. The design shown in FIG. 5B with subwavelength corrugations shows a near perfect PER insensitivity to mask misalignment, although the −0.7 dB IL could still be considered non-negligible for some application. The design shown in FIG. 5C presents a good trade-off between PER and IL minimal degradation.

| Configuration | IL (dB) | PER (dB) |
| --- | --- | --- |
| Conventional vertical taper (FIG. 5A - PRIOR ART) | −1.8 | 7.8 |
| Subwavelength corrugations only (FIG. 5B) | −0.7 | 55.2 |
| Subwavelength corrugations with input width taper (FIG. 5C) | −0.4 | 33.7 |

It will be understood that the polarization rotator assembly 20 according to embodiments of the invention is generally reciprocal, that is, the electromagnetic signal could alternatively enter and exit the polarization rotator assembly 20 via the output and input waveguide portions 34 and 26, respectively, thus going through a reverse polarization rotation. Similarly, the polarization rotator assembly 20 may also be used to convert a TE polarized signal to a TM polarized signal.

By combining a subwavelength composite portion acting a vertical mode converter with a two-level adiabatic polarization rotating portion, embodiments of the present invention may provide a polarization rotator assembly 20 exhibiting a reduced sensitivity to mask misalignment and other fabrication tolerance issues.

Of course, numerous modifications could be made to the embodiments described above without departing from the scope of the present invention.

The invention claimed is:

1. A polarization rotator assembly for rotating a polarization mode of an electromagnetic signal, the polarization rotator assembly comprising:
a waveguiding structure having co-extensive first and second layers and having a first height corresponding to the first layer and a second height corresponding to a superposition of the first and second layers, the waveguiding structure having a waveguiding axis and comprising successively therealong:
an input portion formed by the first layer;
a subwavelength composite portion formed by the first and second layers, where the second layer defines a subwavelength pattern having a characteristic feature size which is less than half an effective wavelength of the electromagnetic signal when propagating therein; and
a polarization rotator portion comprising at least the first and second layers and geometrically configured to rotate a polarization mode of the electromagnetic signal.

2. The polarization rotator assembly according to claim 1, wherein the polarization rotator portion is configured to rotate the polarization mode of the electromagnetic signal by 90 degrees.

3. The polarization rotator assembly according to claim 1, wherein the polarization rotator portion is configured to rotate the polarization mode of the electromagnetic signal from a TM polarized mode to a TE polarized mode.

4. The polarization rotator assembly according to claim 1, wherein the first and second layers are made of silicon, silicon nitride, silicon carbide, indium phosphide, gallium arsenide, a high-index polymer or a combination thereof.

5. The polarization rotator assembly according to claim 1, wherein the subwavelength pattern comprises a series of corrugations formed by said second layer and extending transversally to the waveguiding axis, said series of corrugations being interleaved with a series of gaps.

6. The polarization rotator assembly according to claim 5, wherein the gaps of the subwavelength pattern are filled with air or with a cladding material.

7. The polarization rotator assembly according to claim 5, wherein the series of corrugations has a fixed period.

8. The polarization rotator assembly according to claim 5, wherein the series of corrugations has a variable period.

9. The polarization rotator assembly according to claim 5, wherein the series of corrugations has a fixed duty cycle.

10. The polarization rotator assembly according to claim 5, wherein the series of corrugations has a variable duty cycle.

11. The polarization rotator assembly according to claim 5, wherein the series of corrugations has an aperiodic distribution.

12. The polarization rotator assembly according to claim 1, wherein the subwavelength pattern comprises a series of corrugations formed by said second layer and extending parallel to the waveguiding axis.

13. The polarization rotator assembly according to claim 1, wherein the subwavelength pattern comprises an array of pillars formed by said second layer.

14. The polarization rotator assembly according to claim 1, wherein the subwavelength pattern comprises an array of holes extending through said second layer.

15. The polarization rotator assembly according to claim 1, wherein the subwavelength pattern comprises a wedge-shaped section forming a longitudinally widening taper along said waveguiding axis.

16. The polarization rotator assembly according to claim 1, wherein the subwavelength composite portion tapers down from a first width to a second width.

17. The polarization rotator assembly according to claim 1, wherein the waveguiding structure further comprises a buffer zone between the subwavelength composite portion and the polarization rotator portion.

18. The polarization rotator assembly according to claim 1, wherein the polarization rotator portion is formed by the first and second layers and the rotation of the polarization mode of the electromagnetic signal based on a level difference between the first and the second heights.

19. The polarization rotator assembly according to claim 17, wherein the polarization rotation portion has an input end and an output end, and wherein a width of the second layer along the waveguiding axis decreases from the input end to the output end.

20. The polarization rotator assembly according to claim 18 wherein a width of the first layer along the waveguiding axis increases from the input end to the output end of the polarization rotating portion.

21. The polarization rotator assembly according to claim 1, wherein the polarization rotating portion comprises a polarization-rotating path and a polarization-maintaining path, said polarization rotating portion being geometrically configured to split the electromagnetic signal into two signal polarization components respectively guiding along the polarization rotating and maintaining paths.

* * * * *